Nov. 8, 1960　　D. H. HUBBARD ET AL　　2,959,235
ARTICULATED LIFT TRUCK

Filed April 9, 1958　　　　3 Sheets-Sheet 1

INVENTORS
DEVILLE H. HUBBARD, DECEASED,
BY MRS. MARTHA A. HUBBARD, ADMINISTRATRIX,
& CHESTER H. SUTTON
BY
ATTY.

Nov. 8, 1960  D. H. HUBBARD ET AL  2,959,235
ARTICULATED LIFT TRUCK
Filed April 9, 1958  3 Sheets-Sheet 3

INVENTORS
DEVILLE H. HUBBARD, DECEASED,
BY MRS. MARHTA A. HUBBARD, ADMINISTRATRIX,
& CHESTER H. SUTTON
BY
ATTY.

United States Patent Office 2,959,235
Patented Nov. 8, 1960

2,959,235

ARTICULATED LIFT TRUCK

Deville H. Hubbard, deceased, late of Marshall, Mich., by Martha A. Hubbard, administratrix, Marshall, and Chester H. Sutton, Battle Creek, Mich., assignors to Clark Equipment Company, Buchanan, Mich., a corporation of Michigan Filed Apr. 9, 1958, Ser. No. 727,481

3 Claims. (Cl. 180—13)

This invention relates to industrial trucks used for transporting materials in workshops, factories and the like, and more particularly, to a means of articulating the load carrying unit and the tractor unit of such industrial trucks.

A general object of this invention is to improve industrial trucks by improving the connection or coupling between the load carrying unit and the tractor unit so that effective traction and proper resistance to thrust loads may be maintained while the tractor unit is turning and/or passing over humps or depressions in the floor surface.

Heretofore, in industrial trucks of this type, attempts have been made to improve the connection or coupling between the tractor units and load carrying units; the purpose being to insure traction between the driving wheel, which supports the entire weight of the tractor unit and provides traction for pulling or pushing the load carrying unit, and the floor, and to overcome any differences in the floor level which might tend to reduce this traction.

Such attempts to improve such connections or couplings have included the use of a linkage means forming a parallelogram between the two units, or by pivoting the two units. However, as is apparent, such connections impart rotary or circular movement tending to change the wheel base of the truck. Such connections and, particularly the latter, further make it difficult to maintain the two units in proper alignment due to the tendency of the linkage to bend under side thrusts imposed for example during turning of the truck, and are further deficient in that they do not restrict lateral tipping of one or the other units imposing torque on the linkage from a tendency of the units to rotate as might occur during operation over a rough floor.

We propose to improve such connections or couplings between the tractor unit and the load carrying unit of industrial lift trucks by the provision of a means permitting vertical planar movement between the two units, and which will reduce the cost of manufacture and maintenance. Briefly, this connection is accomplished by the provision of rollers operating in channels between the two units, a portion of such connection being attached to the tractor unit and the other being attached to the load carrying unit whereby when the driving wheel meets an obstacle or a depression in the floor, the tractor units can move vertically up or down without moving away from the load carrying unit; such a coupling being so constructed and arranged to effectively resist lateral and side thrusts as well as torque imposed thereon.

We have found also, that by this arrangement of the coupling means for connection between the two units of industrial trucks of this type that the tractor unit or the load carrying unit may be assembled or disassembled with ease. This arrangement permits the two units to be disassembled or assembled by the mere lifting of one unit vertically with respect to the other by a crane or the like.

Accordingly, still another object of our invention is the provision of a means permitting vertical planar movement between a tractor unit and a load carrying unit in industrial trucks.

Still another more particular object of our invention is the provision of a roller and channel arrangement accomplishing a connection between a tractor unit and load carrying unit in industrial trucks whereby the tractor unit may maintain traction on an uneven flooring on which it is operated and so constructed and arranged to resist lateral and side thrusts as well as torque imposed thereon.

Still another more particular object of our invention is the provision of a new and improved coupling arrangement between a tractor unit and a load carrying unit in industrial trucks permitting the quick and easy assembly and disassembly of such units with respect to one another.

Other and more particular objects of our invention will be apparent to those skilled in the art from the following description and drawings forming a part hereof and wherein.

Figure 1:
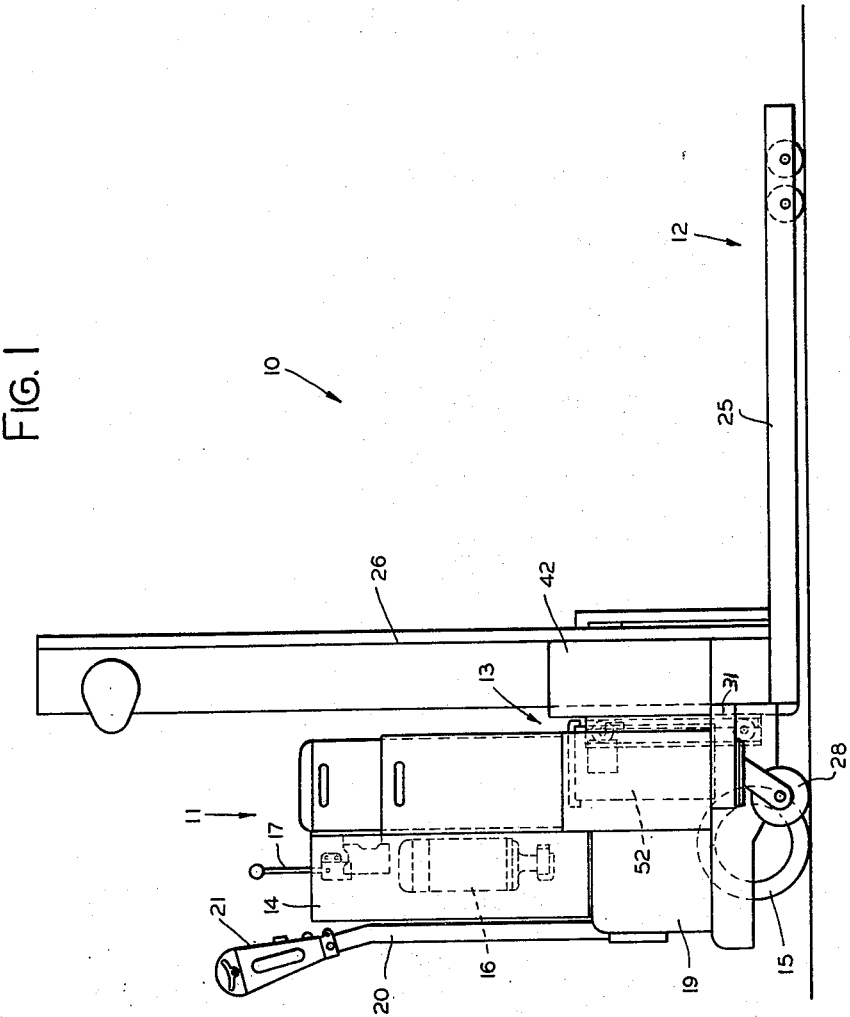
Fig. 1 is a side elevational view showing to advantage the articulate connection between the load carrying connection and the tractor unit of an industrial lift truck.
Figure 2:
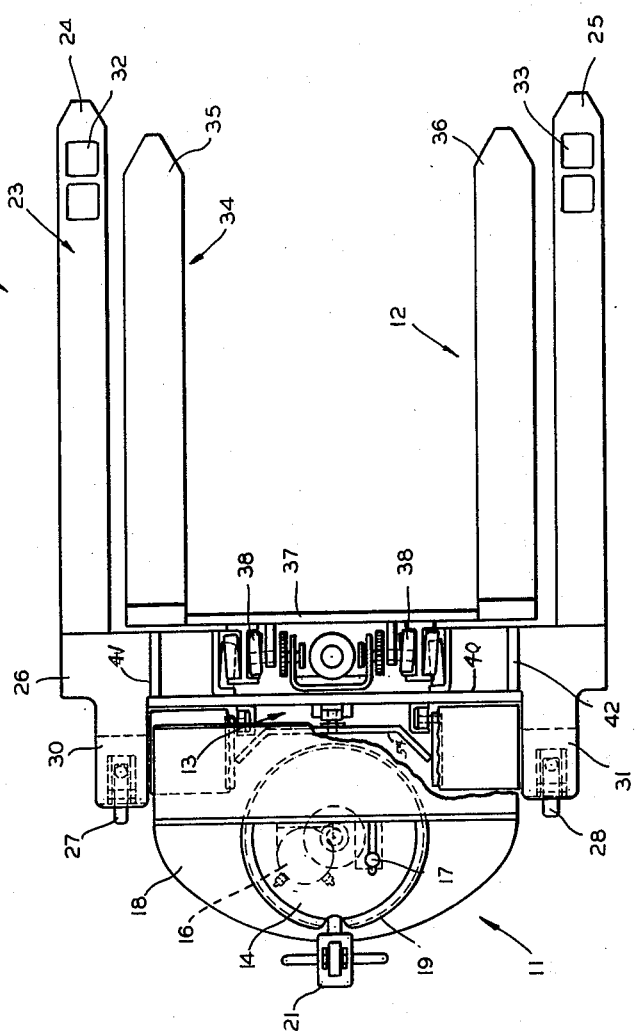
Fig. 2 is a plan view of the lift truck illustrated in Fig. 1, partially broken away, showing to advantage the articulate connection between the two units.

Turning now to Figs. 1 and 2 of the drawings, there is illustrated an industrial truck, indicated in its entirety as 10, having a power head or tractor unit, indicated in its entirety as 11, for moving a load carrying unit or trailer frame, indicated in its entirety as 12. Both units 11 and 12 are connected by an articulating coupling means, indicated in its entirety as 13.

The tractor unit comprises a power head 14, including a suitable battery (not shown) to drive the traction wheel 15, a hydraulic pump and motor combination 16, suitable electric and hydraulic control units, cables and hoses and the like controlled by the lever 17, all mounted on a frame 18, to raise and lower the lifting platform of the load carrying unit 12 as will be explained in detail hereinafter.

The drive or traction wheel 15 and the base 19 of the tractor unit are free to turn about its vertical axis and are in turn steered by a handle 20 having suitable control units 21 for stopping and starting the tractor unit. The handle 20 is further hingedly connected to the base 19 to permit the operator to conveniently handle the truck. Since the construction and operation of this type of tractor unit is conventional and forms no part of this invention, except insofar as it forms a part of the novel connection or coupling to the load carrying unit, no further description hereof is deemed necessary.

Turning now to the load carrying unit 12, sometimes called a trailer wheel frame, it can be seen that such a unit comprises a U-shaped frame 23, comprising a pair of channel-shaped members or outrigger arms 24 and 25 connected at one end to an upright or mast 26. The entire frame 23 is supported on, first, two caster wheels 27 and 28 connected to the mast 26 by a pair of horizontally disposed plates 30 and 31 welded or otherwise connected to the mast 26, extending in a direction opposite to the outrigger arms 24 and 25, and partially encompassing the frame 18 of the truck unit, and second, pairs of trail wheels 32 and 33, disposed near one end of the channel members 24 and 25. Centrally of the U-shaped frame 23 and the mast 26 is a lifting unit 34 comprising a pair of tines 35 and 36 connected at one end by a cross member or tang 37 which, in turn, cooperates with and is suitably connected to suitable sprocket chains, sprockets, power pistons, frictionless roller arrangements cooperating in channels such as illustrated in plan in Fig. 2 and indicated in their entirety as 38, all of which are operated by the pump and motor 16 to raise and lower the tines 35 and 36, when desired. It can be seen that by the construction and arrangement of this U-shaped frame 23 and lifting unit 34, any load on the tines 35 and 36 will be supported without counter-balancing as it is always suspended within the four points comprising the caster wheels 27, 28 and trailer wheels 32, 33. Since the construction and operation of the trailer unit 11 and the means 38 for raising and lowering the lifting unit 34 on the mast 26 is conventional and forms no part of this invention other than as it cooperates with the connecting or coupling means 13, no further description thereof is deemed necessary herein.

Figure 3:
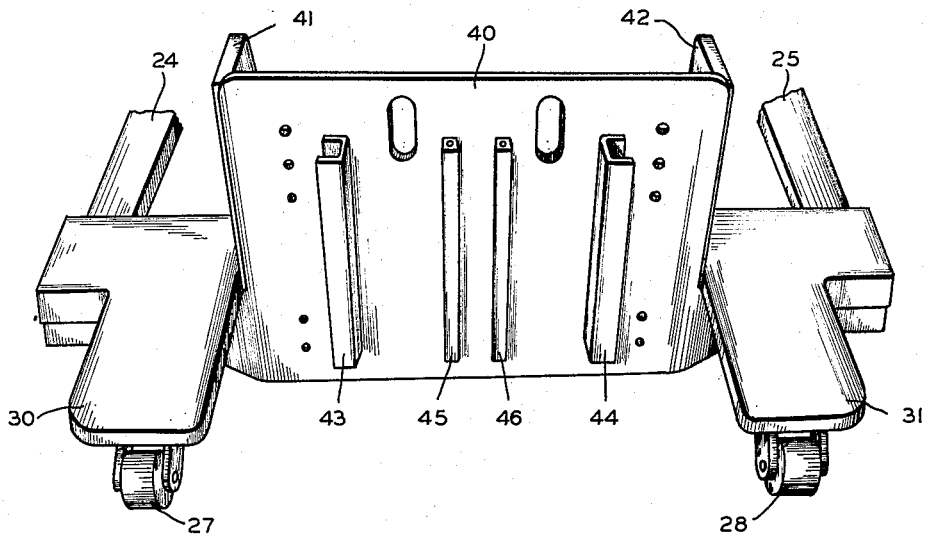
Fig. 3 is an enlarged perspective view of the channel portion of the connection between the two units, such portion being attached to the load carrying unit shown in Figs. 1 and 2.
Figure 4:
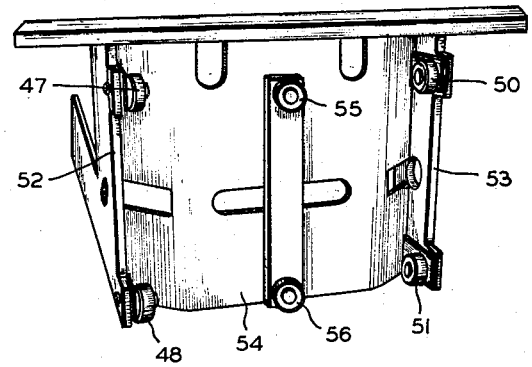
Fig. 4 is an enlarged perspective view of the remainder of the roller connection between the two units, which cooperate with the channels illustrated in Fig. 3; such portion being attached to the tractor unit.

Turning now to Figs. 3 and 4, which illustrate to advantage the articulating connecting means 13, as typically installed as shown in Figs. 1 and 2, it can be seen that a portion of the means 13 (Fig. 3) comprises a vertically disposed rectangular connecting plate 40 having a pair of upright reinforcing flanges 41 and 42, extending rearwardly (as shown in Fig. 3) thereof and horizontally disposed plates 30 and 31 previously described to support the casters 27 and 28 and which have the outrigger arms 24 and 25 formed integral therewith. Plate 40 is suitably affixed to the mast 26 so that the flanges 41 and 42 straddle the mast as shown in Figs. 1 and 2, and is provided on its front face (facing the tractor unit 11), with a pair of vertically disposed channel members 43, 44, the concave portions of which open outwardly or towards the caster wheel supporting plates 30, 31, as illustrated in Fig. 3. The front face of connecting plate 40 is further provided with a pair of bars 45 and 46 vertically disposed parallel to the channel members 43 and 44 and centrally thereof. Channel members 43 and 44 are each arranged to receive a pair of rollers 47, 48 and 50, 51, each disposed to rotate about a horizontal axis and mounted on a pair of vertically disposed flanges 52 and 53 affixed to a second and concave connecting plate 54 forming a portion of the connecting means 13 (Fig. 4). Channels 52 and 53 are disposed at each end of the concave plate 54 which has its concave surface opening towards the truck unit 12 as shown in Fig. 2, flanges 52 and 53 being disposed at the very edges thereof. Still another pair of rollers 55 and 56 are disposed centrally of the connecting plate 54 and arranged to cooperate with the channel formed between the vertical bars 45 and 46 of connecting plate 40 to accommodate sliding or rolling vertical planar movement between the two connecting plates.

From the description, it can be seen that with the connecting plate 40 suitably attached to the mast 26, and with the connecting plate 54 suitably attached to the frame 18 of the tractor unit, two units are free to move vertically parallel to each other allowing the traction wheel 15, which supports the entire tractor unit, free to accommodate any depressions or obstacles in the line of travel to maintain traction throughout. It is to be noted that in this arrangement of the connecting means 13, the movement of the two units 11 and 12 is vertical with respect to each other at all times and that there is no swinging action which would tend to change the wheel base of the industrial tractor unit or rotate the units arcuately, since the rollers 47—51 operating in channels 43 and 44 resist such tendency and, with the rollers 55, 56 cooperating with channel between bars 45, 46, the tendency of the units 11, 12 to tilt due to side thrust is lessened.

From the above description, it can be seen that we have provided an industrial lift truck with a new and improved coupling wherein the cost of manufacture and maintenance requirements have been substantially reduced. This coupling arrangement enables the two units of the truck to be maintained in proper alignment due to the resisting of the coupling to side thrusts, as, for example, during turning, and to resist torque forces resulting from the tendency of the load carrying unit to rotate relative to the tractor unit as might occur during operation over a rough floor, and at the same time permitting the vertical close association between the tractor unit and a load carrying unit to be maintained whereby traction may be maintained at all times. Furthermore, it can be seen with this arrangement that the tractor unit can easily be disassembled from the load carrying unit by the mere lifting of the tractor unit vertically by a crane or the like and can be assembled by bringing the rollers and the channels in registry, one over the other and lowering the unit to the floor.

Wherein the various parts of our invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

We claim:

1. In an industrial lift truck comprising a load carrying unit, a tractor unit, and means connecting said units for relative vertical movement, the improvement comprising that said connecting means includes at least two upright channel means, one opening longitudinally of the units and the other laterally thereof, and at least two pairs of vertically spaced rollers, the rollers of one pair having their axes extending longitudinally of the units and being disposed within the said one channel means and the rollers of the other pair having their axes extending laterally of the units and being disposed within said other channel means, said one channel means and said one pair of rollers being mounted on respective ones of the units for retaining the units against relative lateral movement, said other channel means and said other pair of rollers being mounted on respective ones of the units for retaining the units against relative longitudinal movement.

2. In an industrial lift truck comprising a load carrying unit, a tractor unit, and means connecting said units for relative vertical movement, the improvement comprising that said connecting means includes three laterally spaced vertical channel means, the center channel means opening longitudinally of the units and the others opening laterally thereof in opposite directions, and three pairs of vertically aligned spaced rollers aligned respectively with said channel means, the rollers of the center pair having their axes extending longitudinally of the units and being disposed within the said center channel means, the rollers of the other pairs having their axes extending laterally of the units, the rollers of each of said other pairs projecting toward and being disposed within the respective ones of said other channel means, said center channel means and said center pair of rollers being mounted on respective ones of the units for retaining the units against relative lateral movement and for preventing relative cocking thereof in the vertical plane, each of said other channel means and its respective pair of rollers being mounted on respective ones of the units for retaining the units against relative longitudinal movement and for preventing relative cocking thereof in the horizontal plane.

3. In an industrial lift truck comprising a load carrying unit, a tractor unit, and means connecting said units for relative vertical movement, the improvement comprising that said connecting means includes a pair of transverse vertical connecting plates mounted on respective ones of said units, three laterally spaced vertical channels on one of said plates, the center channel being disposed centrally of the one plate and the other two channels being disposed adjacent the sides of the one plate, the center channel opening longitudinally of the units toward the other plate and the other channels opening laterally of the units and respectively toward the adjacent side of the one plate, the other of said plates being generally U-shaped in plan and being disposed to receive said other channels between the legs thereof, a first pair of vertically aligned spaced rollers mounted on the central portion of said other plate on axes extending longitudinally of the units, said first pair of rollers being disposed within said center channel for rotation therein, and second and third pairs of vertically aligned spaced rollers mounted respectively on the inner surfaces of the legs of said other plate on axes extending laterally of the units, said second and third pairs of rollers being disposed respectively within said other channels for rotation therein, said center channel and said first pair of rollers preventing relative lateral movement of the units and relative cocking thereof in the vertical plane, and said second and third pairs of rollers and said other channels preventing relative longitudinal movement of the units and relative cocking thereof in the horizontal plane.

References Cited in the file of this patent

UNITED STATES PATENTS

| | | |
|---|---|---|
| 2,173,068 | Schroeder | Sept. 12, 1939 |
| 2,370,866 | Lewis | Mar. 6, 1945 |
| 2,643,740 | Quayle | June 30, 1953 |
| 2,684,496 | Lull | July 27, 1954 |
| 2,693,290 | Elliott | Nov. 2, 1954 |
| 2,761,522 | Paradiso et al. | Sept. 4, 1956 |